(12) United States Patent
Russke

(10) Patent No.: US 6,702,361 B2
(45) Date of Patent: Mar. 9, 2004

(54) CONVERTIBLE VEHICLE COMPRISING A TOP STORABLE UNDERNEATH A LID

(75) Inventor: Klaus Russke, Bissendorf (DE)

(73) Assignee: Wilhelm Karmann GmbH, Osnabrück (DE)

(*) Notice: Subject to any disclaimer, the term of this patent is extended or adjusted under 35 U.S.C. 154(b) by 0 days.

(21) Appl. No.: 10/249,959

(22) Filed: May 22, 2003

(65) Prior Publication Data
US 2003/0218353 A1 Nov. 27, 2003

(30) Foreign Application Priority Data
May 23, 2002 (DE) ............................. 202 08 001

(51) Int. Cl.⁷ ................................. B60J 7/00
(52) U.S. Cl. ................ 296/107.08; 296/76; 296/107.01
(58) Field of Search .................. 256/107.08, 76, 256/108, 107.17, 136.06, 37.1, 107.01, 107.07, 107.09, 107.18

(56) References Cited

U.S. PATENT DOCUMENTS

| | | | | |
|---|---|---|---|---|
| 1,609,605 A | * | 12/1926 | Buck | 296/76 |
| 1,707,065 A | * | 3/1929 | Moss et al. | 296/76 |
| 1,774,199 A | * | 8/1930 | Good | 296/76 |
| 1,933,623 A | * | 1/1933 | Gordon | 296/76 |
| 2,007,873 A | * | 7/1935 | Paulin | 296/107.08 |
| 2,086,091 A | * | 7/1937 | Payette | 296/76 |
| 2,234,040 A | * | 3/1941 | Carr | 296/107.08 |
| 2,768,024 A | * | 10/1956 | Spear | 296/107.08 |
| 2,782,070 A | * | 2/1957 | Chaban | 296/107.08 |
| 4,886,312 A | * | 12/1989 | Asoh | 296/76 |
| 5,197,560 A | * | 3/1993 | Oda et al. | 296/76 |
| 5,655,331 A | * | 8/1997 | Schrader et al. | 49/280 |
| 6,010,178 A | * | 1/2000 | Hahn et al. | 296/107.08 |
| 6,062,628 A | * | 5/2000 | Guillez | 296/107.08 |
| 6,092,335 A | * | 7/2000 | Queveau et al. | 296/107.08 |
| 6,131,988 A | * | 10/2000 | Queveau et al. | 296/107.17 |
| 6,250,707 B1 | * | 6/2001 | Dintner et al. | 296/107.08 |
| 6,511,118 B2 | * | 1/2003 | Liedmeyer et al. | 296/107.08 |
| 6,585,307 B1 | * | 7/2003 | Queveau et al. | 296/107.08 |
| 6,595,572 B2 | * | 7/2003 | Schuler et al. | 296/107.08 |
| 6,604,775 B2 | * | 8/2003 | Obendiek | 296/107.08 |
| 2001/0005089 A1 | * | 6/2001 | Neubrand | 296/107.01 |
| 2002/0093218 A1 | * | 7/2002 | Weissmueller et al. | 296/107.08 |
| 2002/0109372 A1 | * | 8/2002 | Weissmueller | 296/107.08 |
| 2002/0171258 A1 | * | 11/2002 | Obendiek | 296/107.08 |
| 2003/0025350 A1 | * | 2/2003 | Sande | 296/107.08 |

FOREIGN PATENT DOCUMENTS

DE  197 56 981 C2  7/1999

\* cited by examiner

Primary Examiner—Kiran Patel
(74) Attorney, Agent, or Firm—Gudrun E. Huckett

(57) ABSTRACT

A convertible vehicle has a car body having a rear vehicle area with a trunk. The rear vehicle area has a roof compartment having a lid. The roof is stowable under the lid in the roof compartment. The lid of the roof compartment is movable for releasing a passageway for stowing the roof and for releasing a loading opening for the trunk. The lid of the roof compartment is of a multi-part configuration and has at least one joint between parts of the lid, wherein the at least one joint extends transversely to a travel direction of the convertible vehicle. For releasing the passageway for the roof, the parts are pivotable relative to one another in a pivot direction. At least one drive-effecting member acts on the parts in the pivot direction.

7 Claims, 6 Drawing Sheets

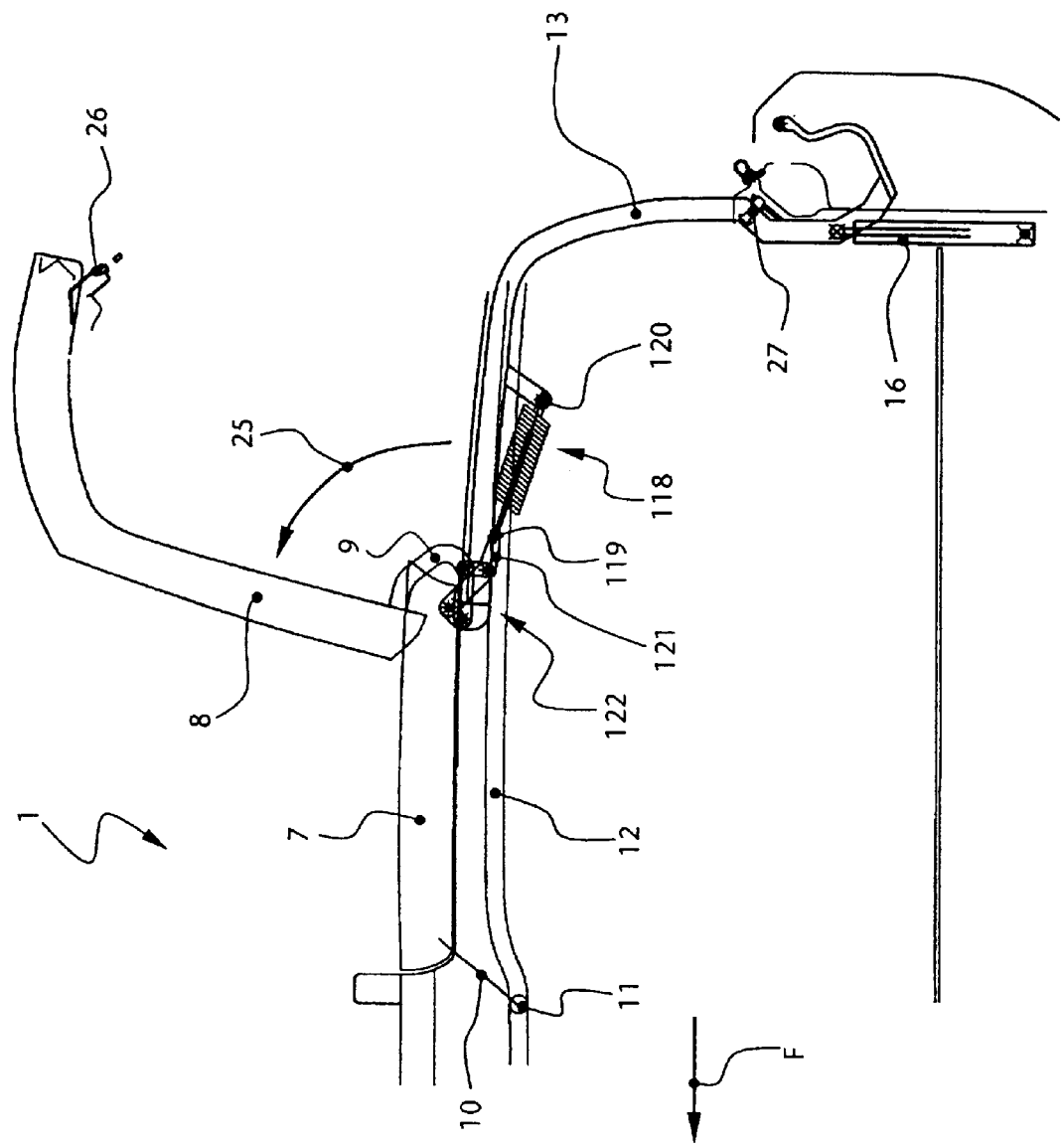

CONVERTIBLE VEHICLE COMPRISING A TOP STORABLE UNDERNEATH A LID

BACKGROUND OF THE INVENTION

1. Field of the Invention

The invention relates to a convertible vehicle comprising a top or roof storable underneath a lid of a roof compartment provided at the rear of the vehicle, wherein the lid of the roof compartment is movable for releasing a passageway for the roof or top and also for releasing the loading opening for the trunk.

2. Description of the Related Art

DE 197 56 981 C2 discloses a convertible vehicle wherein a lid of a roof compartment as a whole is movable, firstly, for releasing the passageway for the roof or top to be opened or closed, into a position defining an acute angle relative to the travel direction of the vehicle and, secondly, for releasing a loading opening for the trunk, into a position defining an obtuse angle relative to the travel direction of the vehicle.

For releasing the trunk opening as well as for releasing the passageway for the roof, the entire lid of the roof compartment must be moved. Because of this, the drive members must be configured relatively large. For example, a hydraulic drive device requires a large space for the drive and the corresponding hydraulic oil reservoir. Moreover, there is the problem that upon pivoting of the lid of the roof compartment for releasing the passageway for the roof, the front end of the lid must be pivoted into a relatively high position; in garages with low ceilings this can cause a problem in that the front end of the lid can hit objects, for example, venting pipes or other installations reducing the inner height of the garage.

In particular, in the case of convertible vehicles having a partially or entirely flexible folding roof or top with a rear roof part, for example, a rear bow, resting on the lid of the roof compartment in the closed position of the roof, the rear roof part must first be lifted up high. Only thereafter is it possible to pivot the lid of the roof compartment in the described way where the leading edge of the lid of the roof compartment is guided upwardly at a great pivot radius. Opening of the lid of the roof compartment can be carried out only after completion of the lifting movement of the rear roof part so that the opening and closing movements of the roof or top require a relatively long period of time. Moreover, drive members with a long lifting stroke must be provided also for the rear roof part.

SUMMARY OF INVENTION

It is an object of the present invention to improve the convertible vehicle of the aforementioned kind such that the aforementioned disadvantages are avoided.

In accordance with the present invention, this is achieved in that the lid of the roof compartment is of a multi-part configuration and comprises at least one joint extending between the parts, wherein the joint extends substantially transverse to the travel direction, wherein, for releasing the passageway for the roof, the multiple parts of the lid of the roof compartment are configured to be pivotable relative to one another, and in that at least one drive member or drive action-supporting member is provided which acts in the pivot direction of the parts when pivoting relative to one another.

The convertible vehicle according to the invention does not require that, for releasing the passageway for the roof, the entire lid of the roof compartment must be pivoted into an open position; instead, the individual parts of the lid can be moved toward one another—in other word, one part pivots relative to the other part—so that the energy expenditure is reduced and the drive members can be configured to be correspondingly smaller. By means of the additional drive-effecting member (drive member or drive action supporting member), which at least supports the pivot movement of the parts, the force expenditure for movement of the lid of the roof compartment is minimized. The tolerances of the mechanical parts of the lid of the roof compartment can be relatively great because, as a result of the additional drive-effecting member, canting of the parts cannot occur; instead, the parts pivot relative to one another independent of the guide action provided by the carbody when the lid is opened.

In particular, when an additional auxiliary frame is provided, which extends underneath a rear part of the lid of the roof compartment, a standard lock can be used which connects the rear end of the lid of the roof compartment with the carbody and which locks when the lid of the roof compartment is closed. The pivoting action by means of the auxiliary frame reduces the forces which act on the lock. In this respect, the use of relatively simple and inexpensive components is possible.

When advantageously the drive member or drive action supporting member, i.e., the drive-effecting member, is embodied as a tension spring, the pivoting action of the parts of the lid as well as the opening action of the rear part of the lid for releasing the loading opening for luggage is supported. In this way, while a supporting action for opening the lid for releasing the passageway for the roof is provided, an impairment of the opening action of the lid for releasing the loading opening for luggage is not caused by the additional member.

BRIEF DESCRIPTION OF DRAWINGS

FIG. 6 is a view similar to FIG. 3 of the alternative embodiment.

DETAILED DESCRIPTION

Figure 1:
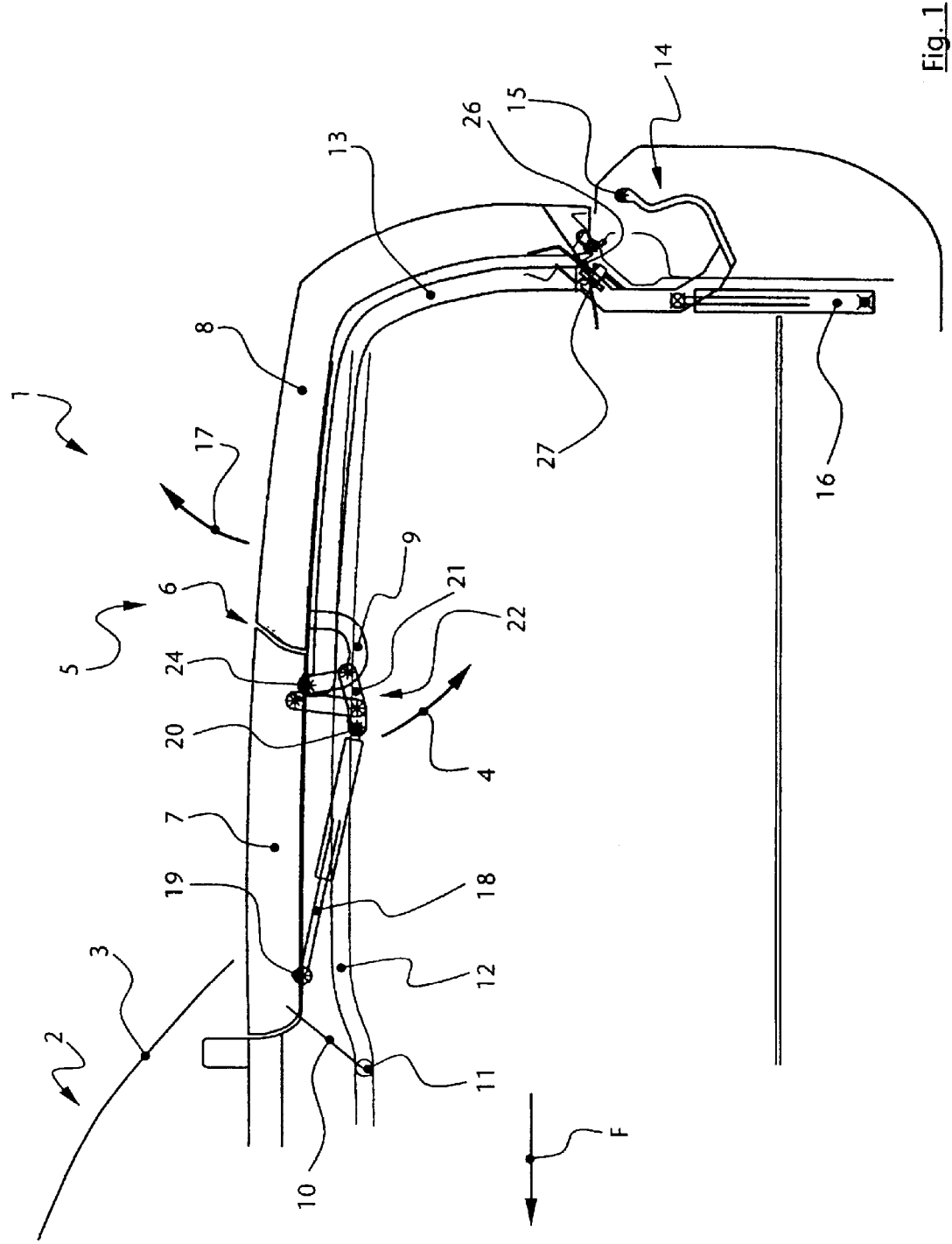
FIG. 1 is a schematic side view of the rear of a convertible vehicle showing the lid of the roof compartment in the closed position.
Figure 2:
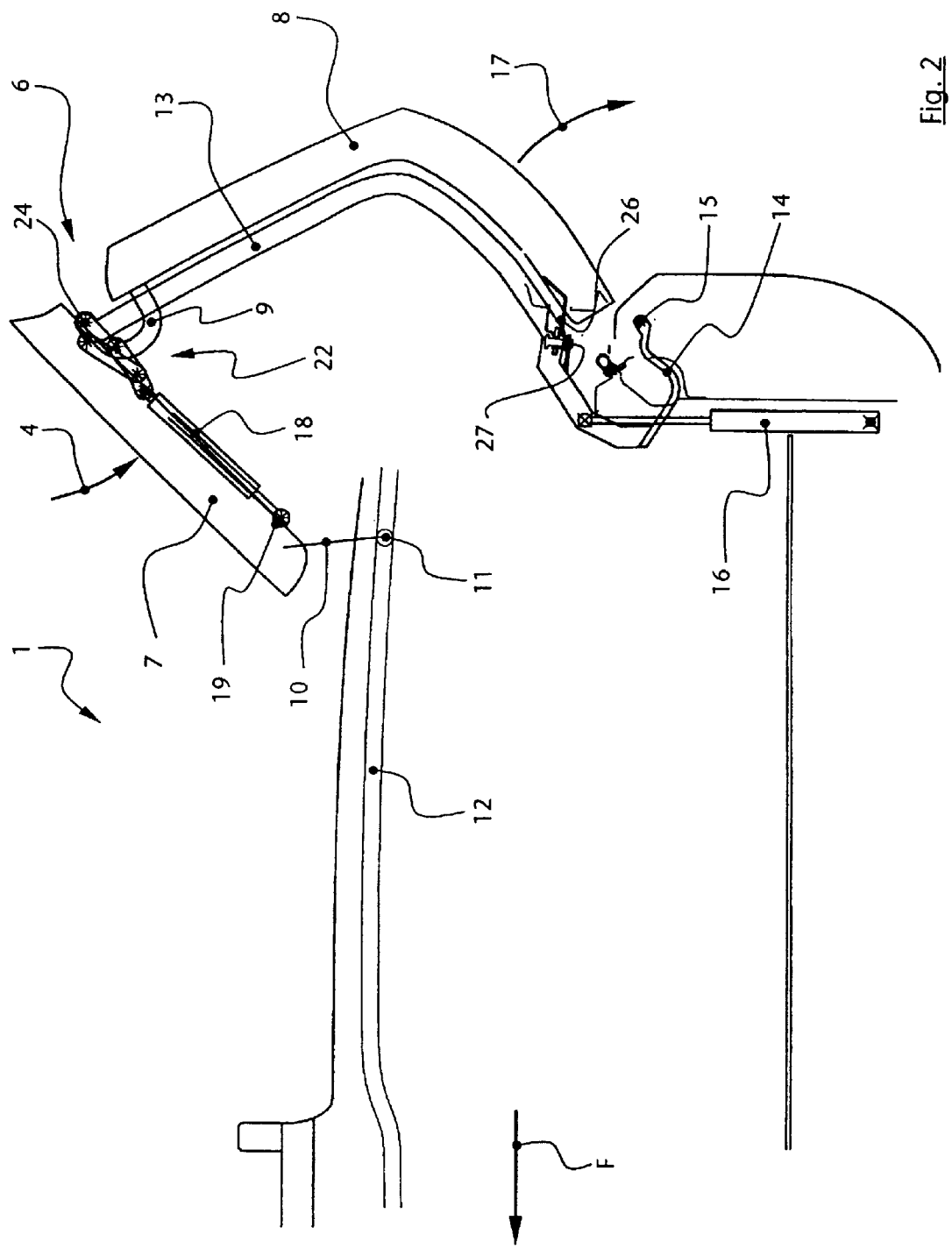
FIG. 2 is a view a similar to FIG. 1 with the passageway for the roof being released.
Figure 3:
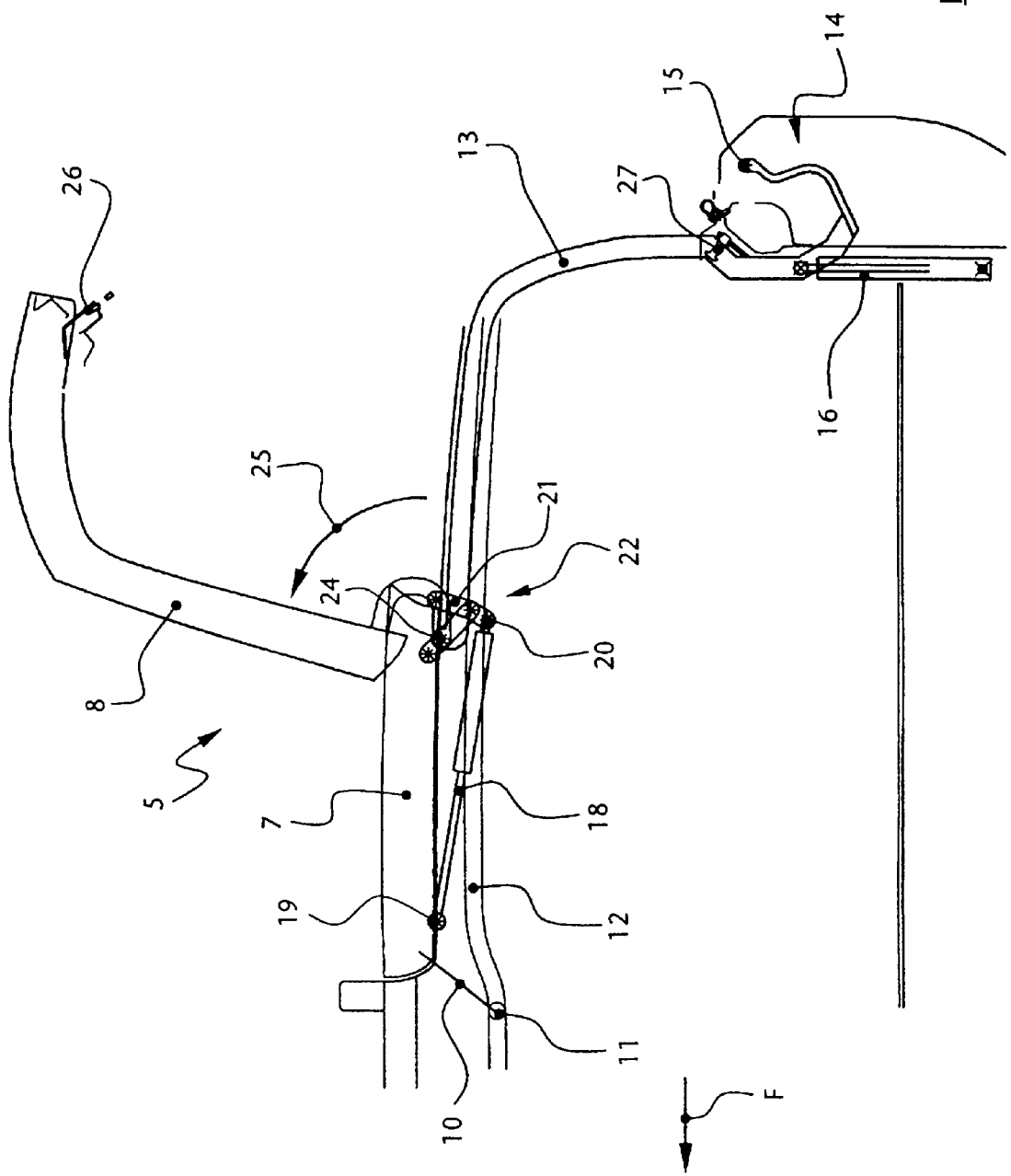
FIG. 3 is a view similar to FIG. 2 where the loading opening for the trunk is released.

The FIGS. 1 through 3 show the rear of a convertible vehicle 1. It has a roof 2 comprising in the illustrated embodiment a rigid rear roof part 3 and supporting a rear window. The roof 2 can be comprised of rigid roof parts. Also, it is possible that the roof 2 is partially or essentially completely flexible. However, in any case, a rigid rear roof part remains, for example, in the form of a bow, by means of which the roof 2 is supported on the carbody.

The roof 2 in its entirety can be positioned underneath the lid 5 of a compartment for the roof. The lid 5 is of a multi-part configuration (comprised of several lid parts) and comprises in the illustrated embodiment separate parts 7, 8 separated from one another at the transverse joint 6. In the closed state, the part 7 is arranged in front of the rear part 8, when viewed in the travel direction F. The part 7 is horizontal; the part 8 comprises a horizontally positioned portion and a vertical portion adjoining to the rear. Both parts 7, 8 of the lid 5 of the roof compartment are connected to one another by means of a gear unit 22 with a gear part 9 so that they can be pivoted in the direction of arrow 4 relative to one another. The parts 7, 8 cover or close the roof compartment as well as the trunk.

The forward part 7 is supported by means of arms 10, correlated with the vehicle sides, respectively, in lateral guide paths 12 which extends substantially in the longitudinal direction of the vehicle. The arms 10 have at their free ends bearing journals, glide members or similar bearing elements 11 engaging the lateral guide paths 12. The guide paths 12, for example, can be formed by metal rails which are substantially C-shaped. The bearing journals, glide members or other guide elements 11 which are longitudinally slidably guided in the guide paths or rails 12 are connected with the arms 10 in a pivotable way such that pivoting of the arms 10 in the transverse direction of the vehicle is possible. For this purpose, ball-and-socket joints can be provided. In this way, it is possible that the guide rails 12 correlated with the longitudinal sides of the vehicle do not extend parallel to one another but converge in a direction counter to the travel direction F so the rear of the vehicle can have a tapering configuration.

Underneath the rear part 8 of the lid 5 of the roof compartment an auxiliary frame 13 is provided which supports the part 8. Its rear area is secured on a hinge 14 pivotable about a transverse axis of rotation 15 extending transversely with respect to the longitudinal vehicle axis. The axis of rotation 15 of the hinge 14 is moved far to the rear such that a favorable kinematic pivoting action is ensured. When carrying out the stowing movement of the roof, the auxiliary frame 13 projects through the carbody area outwardly and, in the illustrated embodiment, is within the loading opening for the trunk. With a suitable configuration of the auxiliary frame, however, it is also possible to realize that it is located outside of the loading opening. Possible transverse supports can be provided above or below the loading opening for the trunk.

In order to effect the pivot movement about the axis 15, at least one drive member 16 is provided which is a hydraulic cylinder in the illustrated embodiment. For ensuring a sufficient torsion-resistant movement, advantageously two drive members 16 are provided which are correlated with the vehicle sides, respectively. A central drive member 16 which acts by means of a synchronization linkage or a similar means on both vehicle sides is also possible.

The drive member(s) act(s) directly only onto the rear part 8 of the lid 5 of the roof compartment. By extending the illustrated cylinder 16, the rear roof part 8 is pivoted about the axis 15 into the open position in the direction of arrow 17.

The forward lid part 7 can be guided in the lateral guide rails 12 in the way described above by means of the arms 10 and the bearing element 11. However, this is not mandatory. Instead, an additional drive member or drive-supporting member 18 can be provided which, according to the first embodiment (FIGS. 1 through 3), is a pneumatic spring. It is supported with one end 19 on the forward part 7 of the lid 5 of the roof compartment. The opposite end 20 of the drive-supporting member 18 engages a first lever 21 of the gear unit 22. By means of this gear unit 22, which is force-loaded by the drive member or drive-supporting member 18, the forward part 7 can be pivoted in direction of arrow 4 by means of the hinge 9 toward the rear part 8. In this way, an active pivoting of the parts 7, 8 relative to one another is effected. Canting, for example, of the bearing part 11 in the guide rail 12, cannot occur. Accordingly, the total opening movement of the lid 5 of the roof compartment can be carried out without any jerking movements. Moreover, the rear drive member 16 can be relatively small because it must not work against a canting part. In this way, mounting space is saved which is made available as trunk space. The force introduction into the hinge 14, which pivots about the rearward axis 15, is also minimized. The drive member 16 is no longer responsible for the opening movement of the entire lid of the roof compartment but only for the rear part 8 of the lid 5. Therefore, it is relieved of the movement of the front part 7 whose relative movement relative to the part 8 is achieved by the additional drive member or drive-supporting member 18. During pivoting of the part 7 toward the rear part 8, the force is continuously reduced by the lever action of the gear unit 22.

For effecting the release of the loading opening for the trunk space (FIG. 3), the front part 7 remains in a horizontal rest position. Only the rear part 8 is pivoted upwardly about the axis 24, where the part 8, the auxiliary frame 13, and the front part 7 are connected with one another, in the direction of arrow 25.

When doing so, the lock 26 provided on the rear lid will disengage the locking pin 27 which is provided on the auxiliary frame 13. With this arrangement of the pin 27 on the auxiliary frame 13, and the correlation of the pin 27 with the movable parts, the tolerance of the movable parts relative to the stationary parts of the illustrated embodiment is further improved.

Since the pneumatic spring 18 illustrated in FIGS. 1 through 3 exerts a piston-pushing force to thus support the pivoting movement according to FIG. 2, forces act counter to the force of the pneumatic spring 18 during the opening movement of the rear part 8 for releasing the loading opening for the trunk so that an increased force expenditure is required.

Figure 4:
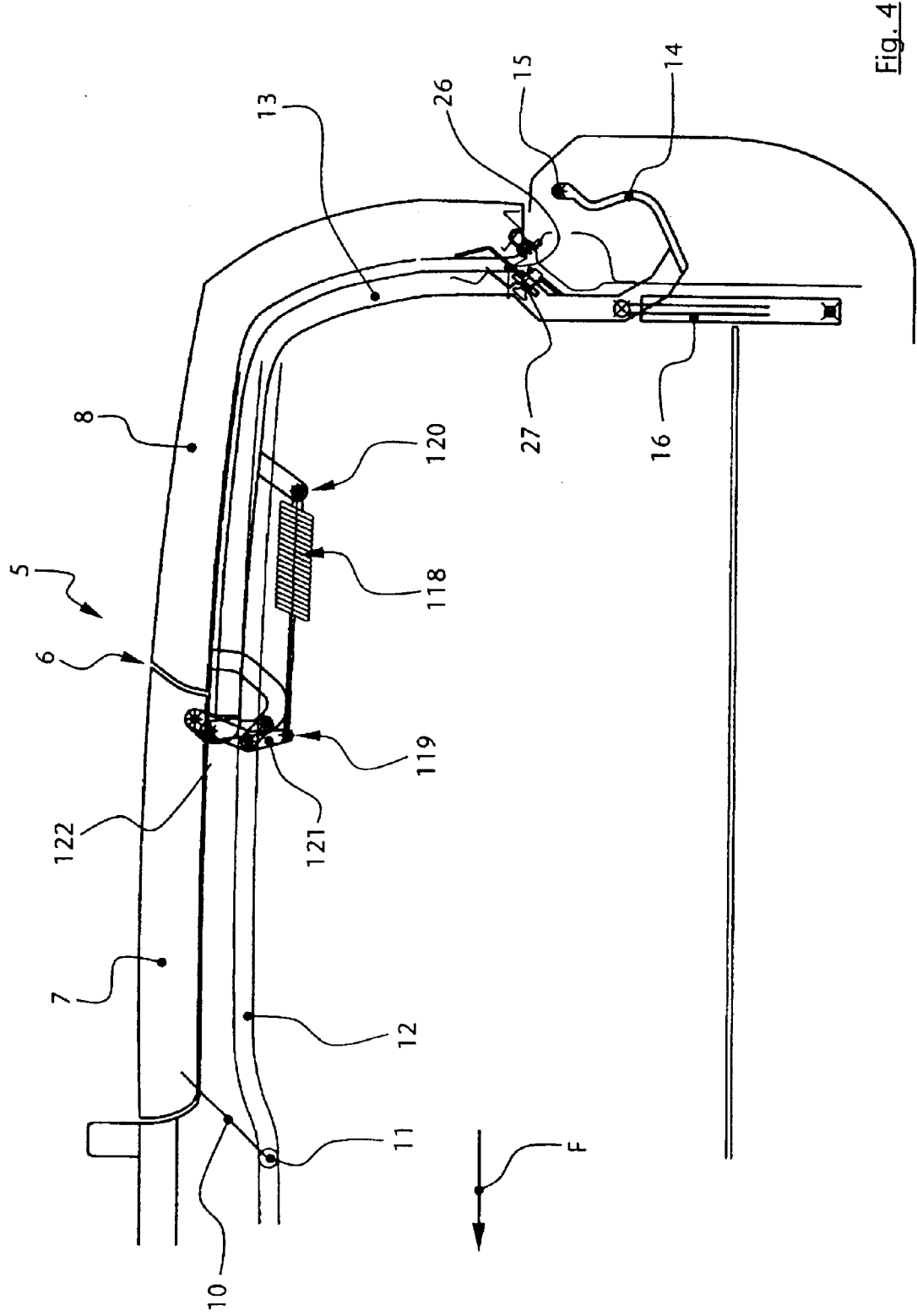
FIG. 4 is a view similar to FIG. 1 of an alternative embodiment with a tension spring.
Figure 5:
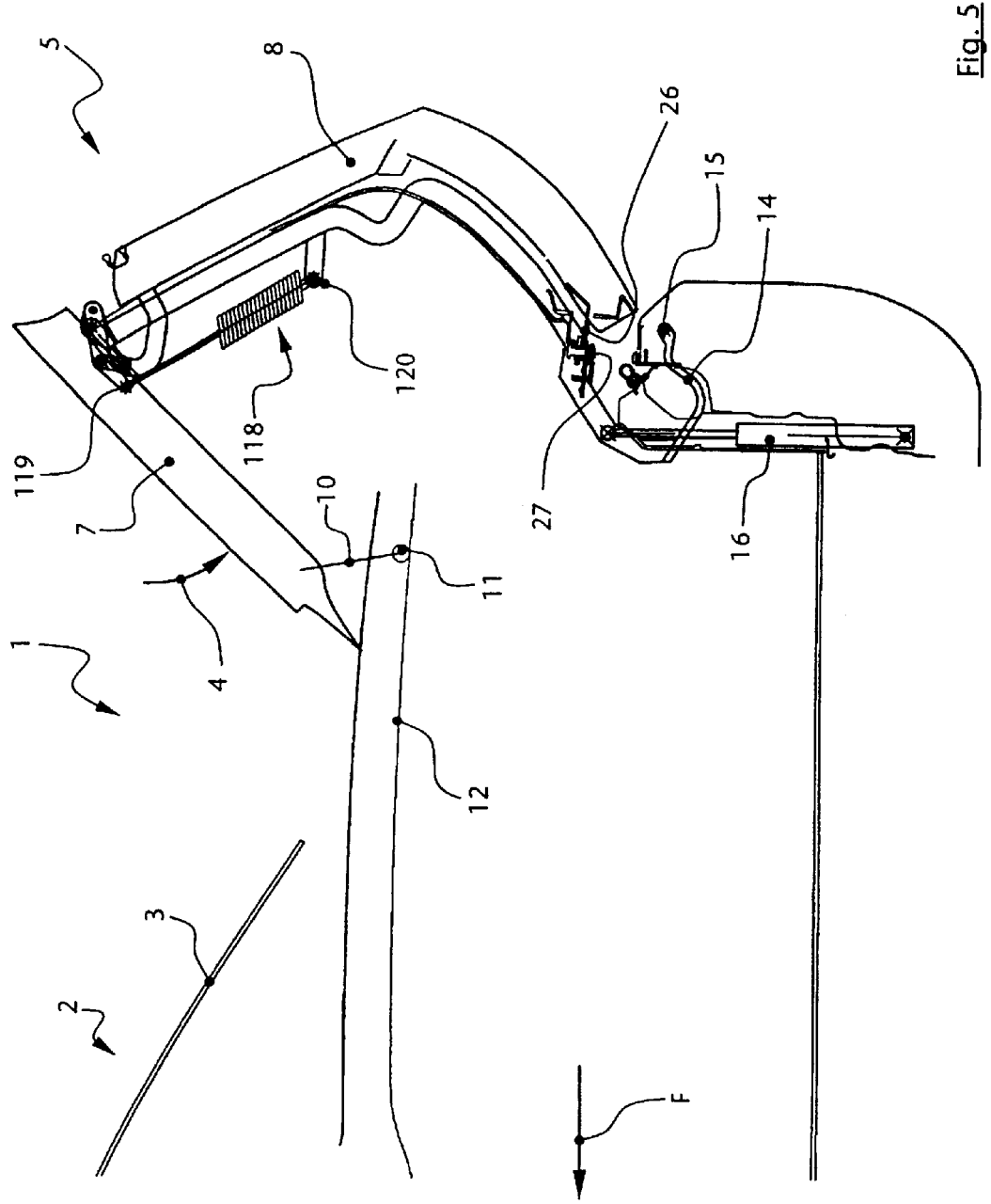
FIG. 5a view similar to FIG. 2 of the alternative embodiment.

In order to achieve an optimization in this respect, the second embodiment according to FIGS. 4 through 6 is suggested. In this embodiment, the drive member or drive action supporting member 118 is embodied as a tension spring and connected with its rear end 120 to the auxiliary frame 13. The forward end 119 engages a lever 121 of the gear unit 122.

For releasing the passageway for the roof, the drive member 16 is extended, as in the first embodiment, so that the rear part 8 of the lid 5 of the roof compartment is pivoted in the same direction as in FIG. 2. Also, the front roof part 7 pivots in the direction of arrow 4 relative to the rear part 8. The pivoting action is at least supported by the tension force of the tension member 118.

When pivoting the rear part 8 into the open position for releasing the loading opening for the trunk (FIG. 6), the tension spring 118 provides a supporting force in that it engages the lever 121 of the gear unit 122 such that the lever 121 acts on the hinge 9 in the direction of opening the rear part 8 of the lid 5 of the roof compartment. Accordingly, both opening movements of the lid 5 of the roof compartment are supported by the tension member 118 in this configuration. Since upon the release of the loading opening for the luggage the auxiliary frame 13 remains in its rest position, it provides a stabilizing element and it can serve as a rigid support or abutment providing a connecting point (120) for the rear end of the tension spring 118.

In addition to the illustrated embodiment, additional drive members or drive action supporting members elements for pivoting the parts 7, 8 relative to one another are possible. Their connecting points can vary, as illustrated. Also, it is possible to connect the drive member or drive action supporting member directly to the parts 7, 8.

While specific embodiments of the invention have been shown and described in detail to illustrate the inventive principles, it will be understood that the invention may be embodied otherwise without departing from such principles.

What is claim is:

1. A convertible vehicle comprising:

a car body having a rear vehicle area with a trunk;

the rear vehicle area having a roof compartment with a lid;

a roof stowable under the lid (5) in the roof compartment;

wherein the lid (5) of the roof compartment is movable for releasing a passageway for stowing the roof and for releasing a loading opening for the trunk;

wherein the lid (5) of the roof compartment is of a multi-part conflagration and comprises at least one joint (6) between parts (7, 8) of the lid (5), wherein the at least one joint (6) extends transversely to a travel direction of the convertible vehicle;

wherein, for releasing the passageway for the roof, the parts (7, 8) are pivotable relative to one another in a pivot direction;

at least one drive-effecting member (18, 118) acting on the parts (7, 8) in the pivot direction.

2. The convertible vehicle according to claim 1, wherein, for releasing the passageway for the roof, a first one (7) of the parts (7, 8) is pivotable relative to a second one (8) of the parts (7, 8).

3. The convertible vehicle according to claim 1, wherein, for releasing the loading opening for the trunk, at least a forwardly positioned one (7) of the parts (7, 8), forwardly positioned in the travel direction of the vehicle, remains in a rest position and wherein the at least one drive-affecting member (118) acts on a rearwardly positioned one (8) of the parts (7, 8), positioned rearwardly relative to the travel direction, for effecting pivoting relative to the forwardly positioned part (7).

4. The convertible vehicle according to claim 3, wherein the at least one drive-effecting member is a tension spring (118).

5. The convertible vehicle according to claim 3, further comprising an auxiliary frame (13) arranged underneath a plane of extension of the rearwardly positioned part (8), wherein the auxiliary frame (13) forms a support for the at least one drive-effecting member (118), wherein the at least one drive-effecting member extends form the auxiliary frame (13) to a lever (121) connected to the forwardly positioned part (7) and is connected to the lever (121).

6. The convertible vehicle according to claim 1, having a common axis (24), wherein the rearwardly positioned part (8) pivots about the common axis (24) when opening the loading opening for the trunk, wherein the auxiliary frame (13) is pivotable connected to the common axis (24), and wherein the forwardly positioned part (7) pivots relative to the rearwardly positioned part (8) about the common axis (24).

7. The convertible vehicle according to claim 1, further comprising a gear unit (22, 122), wherein the lid (5) consists of two of the parts (7, 8) and wherein the two parts (7, 8) are connected to one another by the gear unit (22, 122).

* * * * *